(12) United States Patent
Meldolesi et al.

(10) Patent No.: US 9,689,776 B2
(45) Date of Patent: Jun. 27, 2017

(54) APPARATUS FOR GENERATING AND APPLYING LINEAR FORCES

(71) Applicant: Southwest Research Institute, San Antonio, TX (US)

(72) Inventors: Riccardo Meldolesi, Hove (GB); Peter Mark Lee, Fair Oaks Ranch, TX (US)

(73) Assignee: Southwest Research Institute, San Antonio, TX (US)

( * ) Notice: Subject to any disclaimer, the term of this patent is extended or adjusted under 35 U.S.C. 154(b) by 270 days.

(21) Appl. No.: 14/534,951

(22) Filed: Nov. 6, 2014

(65) Prior Publication Data

US 2016/0131553 A1     May 12, 2016

(51) Int. Cl.
*G01M 13/04*     (2006.01)

(52) U.S. Cl.
CPC ................... *G01M 13/04* (2013.01)

(58) Field of Classification Search
CPC ..... G01M 13/04; F16C 19/522; F15B 15/149; F15B 2211/20576
See application file for complete search history.

(56) References Cited

U.S. PATENT DOCUMENTS

| 4,038,863 A | 8/1977 | Mellor et al. | |
|---|---|---|---|
| 4,672,838 A | 6/1987 | Reh | |
| 2012/0323372 A1* | 12/2012 | Gattermann | G01M 13/04 700/275 |
| 2016/0054198 A1* | 2/2016 | Taguchi | G01M 13/04 73/593 |
| 2016/0169381 A1* | 6/2016 | Novak | F16H 61/30 92/152 |

FOREIGN PATENT DOCUMENTS

| EP | 0 305 018 A2 | 3/1989 | |
|---|---|---|---|
| JP | 61151440 A | 7/1986 | |
| JP | 02162241 A | 6/1990 | |
| JP | 2007003196 | * 1/2007 | ............ G01M 13/04 |
| JP | 2009 080092 A | 4/2009 | |

OTHER PUBLICATIONS

K. Hoag, "Dynamic Bearing Rig Consortium/ Tech Review"; (17 pgs); 2<<www.dynamicbearingrig.swri.org>>; Mar. 28, 2014.
A. Uludogan, et al, "Exploring The Use of Multiple Injectors and Split Injection to Reduce DI Diesel Engine Emissions" SAE962058; (16 pgs) <<http://www.erc.wisc.edu/papers/SAE962058.php>> (accessed May 13, 2014).

* cited by examiner

*Primary Examiner* — Blake A Tankersley
(74) *Attorney, Agent, or Firm* — Grossman, Tucker, Perreault & Pfleger, PLLC

(57) ABSTRACT

An apparatus including a piston bore, exhibiting a longitudinal axis, and a piston, including a piston head and a piston shaft. The piston being axially displace-able within the piston bore along the longitudinal axis. The piston bore and a first surface of the piston head form a first working volume and displacement of the piston alters the first working volume. The apparatus also includes a first plurality of injectors coupled to the first working volume and a first common rail. The first plurality of injectors are configured to inject a hydraulic fluid from the common rail into the first working volume. The first common rail is configured to store the hydraulic fluid at an elevated pressure of 1,000 bar or greater. The apparatus includes a flow path between the first working volume and a reservoir for the hydraulic fluid.

13 Claims, 21 Drawing Sheets

APPARATUS FOR GENERATING AND APPLYING LINEAR FORCES

FIELD

The present disclosure relates to an apparatus and a method of generating and applying linear forces and, in particular, for replicating bearing loading conditions for internal combustion engines.

BACKGROUND

Driven by emission legislation and market force, specific power and peak cylinder pressure of light and heavy duty internal combustion engines have increased over the past few decades. Factors that have contributed to these increases include improvements in crankshaft design, improvements in bearing design, advances in bearing materials, and relatively more efficient manufacturing techniques.

In part, research focuses on reducing friction in the crankshaft bearing through thinner bearings in conjunction with reduced lubricant viscosity, wherein lubricant viscosity may be reduced by modifying the oil blends and/or by operating at relatively higher temperatures. In addition to plain bearings, roller bearings have been investigated for application in crankshafts, particularly for main journal support. Typically, such research is accomplished through a combination of simulation and experimental techniques to take proposed designs and material formulations from concept to testing on fired engines.

In one experimental technique, a bearing may be installed in a testing rig and a lubricant is added. The bearing rotates while a low frequency, sinusoidal load is applied and the bearing is generally subjected to static misalignment. Bearing wear and lubricant characteristics, such as lubricant viscosity and degradation, may be measured during the course of testing. However, these devices generally do not simulate the operating conditions of the bearings and lubricants in combustion engines and the correlation to engine wear or fatigue life is relatively poor. Engine testing on the other hand, may be relatively complex. The tests may be relatively costly, the ability to instrument may be difficult, and the ability to separate control and variables of interest may be difficult.

In combustion engines, the load magnitude on a bearing may be relatively large, such as in the range of 20 kN to 300 kN and the loads applied to the bearings change relatively rapidly, such as in the range of (+/−) 20 kN/ms to (+/−) 200 kN/ms. Often devices that are capable of generating rapidly varying loads, like solenoids, piezoelectric actuators, voice coils, etc., are not generally capable of producing the forces experienced in a combustion engine. Systems that may be powerful enough to provide loads close to those exhibited in combustion engines may lack in other areas. For example, mechanical systems may not be able to cover a wide enough load range and speeds. Hydraulic systems may not exhibit a high enough rate of load change due to relatively large flow rates of the hydraulic fluid as well as due to the compliance of the oil and testing apparatus.

Accordingly, room for improvement remains in the development of a bearing test rig that may be capable of replicating the load history experienced by cranktrain bearings. Such rigs may utilize actual components when possible, supply a lubricant through the testing shaft, and enhance pressure to replicate centrifugal forces. Further, such testing may better quantify start-up and shut-down wear, scuff onset and scuff onset conditions, and bearing fatigue life under various conditions.

SUMMARY

An aspect of the present disclosure relates to an apparatus. The apparatus includes a piston bore, which exhibits a longitudinal axis, and a piston, including a piston head and a piston shaft. The piston is axially displace-able within the piston bore along the longitudinal axis. In addition, the piston bore and a first surface of the piston head form a first working volume and displacement of the piston alters the first working volume. The apparatus also includes a first plurality of injectors coupled to the first working volume and a first common rail. The first plurality of injectors are configured to inject a hydraulic fluid from the common rail into the first working volume. The first common rail is configured to store the hydraulic fluid at an elevated pressure of 1,000 bar or greater. The apparatus also includes a pump coupled to the first common rail configured to maintain the hydraulic fluid in the common rail at the elevated pressure. In addition, the apparatus includes a flow path between the first working volume and a reservoir for the hydraulic fluid.

Another aspect of the present disclosure relates to a method of testing a bearing. The method includes associating a bearing with a piston, wherein the piston is longitudinally displace-able within a piston bore along a longitudinal axis of the piston bore. The method further includes supplying a hydraulic fluid to a common rail, wherein the hydraulic fluid is maintained at an elevated pressure of 1,000 bar or greater. The method also includes supplying the hydraulic fluid from the common rail to a first working volume by a first plurality of injectors coupled to the common rail and displacing the piston, wherein the first working volume is defined by the piston bore and a first surface of the piston. A load may then be applied to the bearing.

BRIEF DESCRIPTION OF DRAWINGS

The above-mentioned and other features of this disclosure, and the manner of attaining them, may become more apparent and better understood by reference to the following description of embodiments described herein taken in conjunction with the accompanying drawings, wherein:

FIG. 3b illustrates the apparatus for generating and applying linear forces of FIG. 3a;

FIG. 7b illustrates a side view of the apparatus of FIG. 7a;

DETAILED DESCRIPTION

Figure 1A:
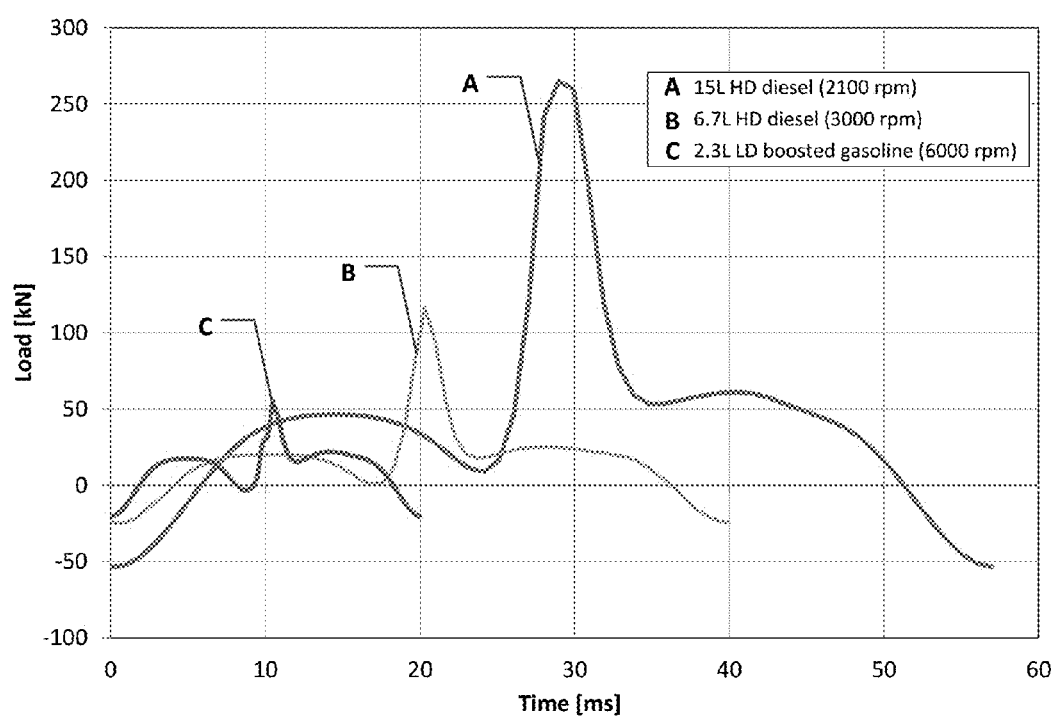
FIG. 1a illustrates a typical load history for a connecting rod big end bearing over a period of time for a 15 L heavy duty diesel engine at 2100 rpm (A), a 6.7 L heavy duty diesel engine at 3000 rpm (B), and a 2.3 L light duty boosted gasoline engine at 6,000 rpm (C)

It may be appreciated that the present disclosure is not limited in its application to the details of construction and the arrangement of components set forth in the following description or illustrated in the drawings. The embodiments herein may be capable of other embodiments and of being practiced or of being carried out in various ways.

Figure 1B:
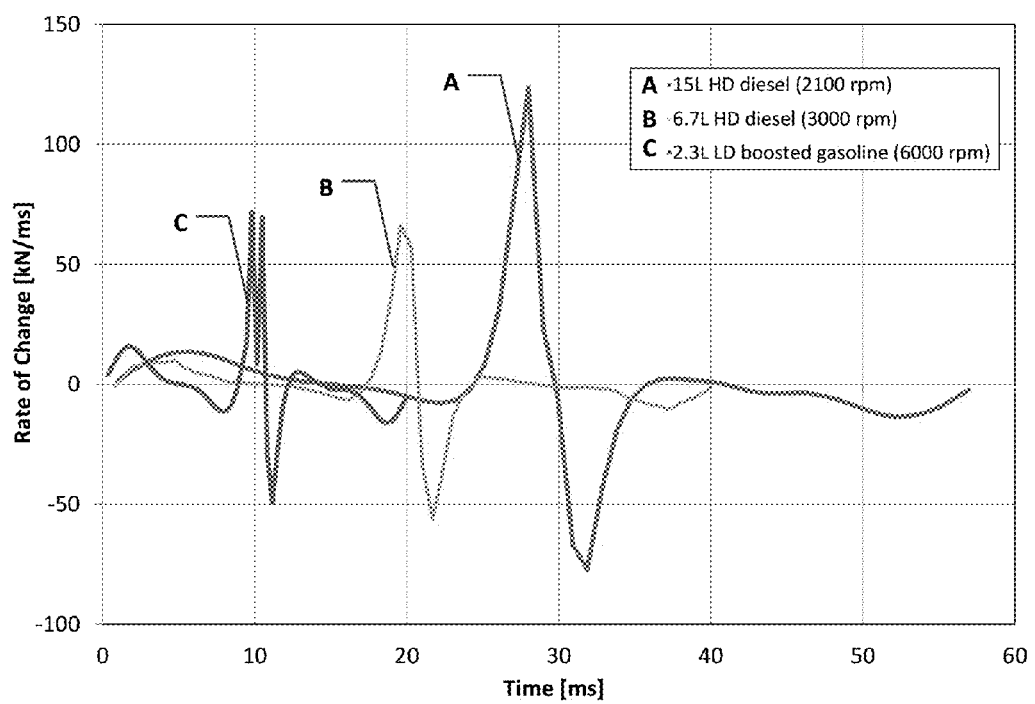
FIG. 1b illustrates a typical rate of load change for a connecting rod big end bearing over a period of time for a 15 L heavy duty diesel engine at 2100 rpm (A), a 6.7 L heavy duty diesel engine at 3000 rpm (B), and a 2.3 L light duty boosted gasoline engine at 6,000 rpm (C)
Figure 2:
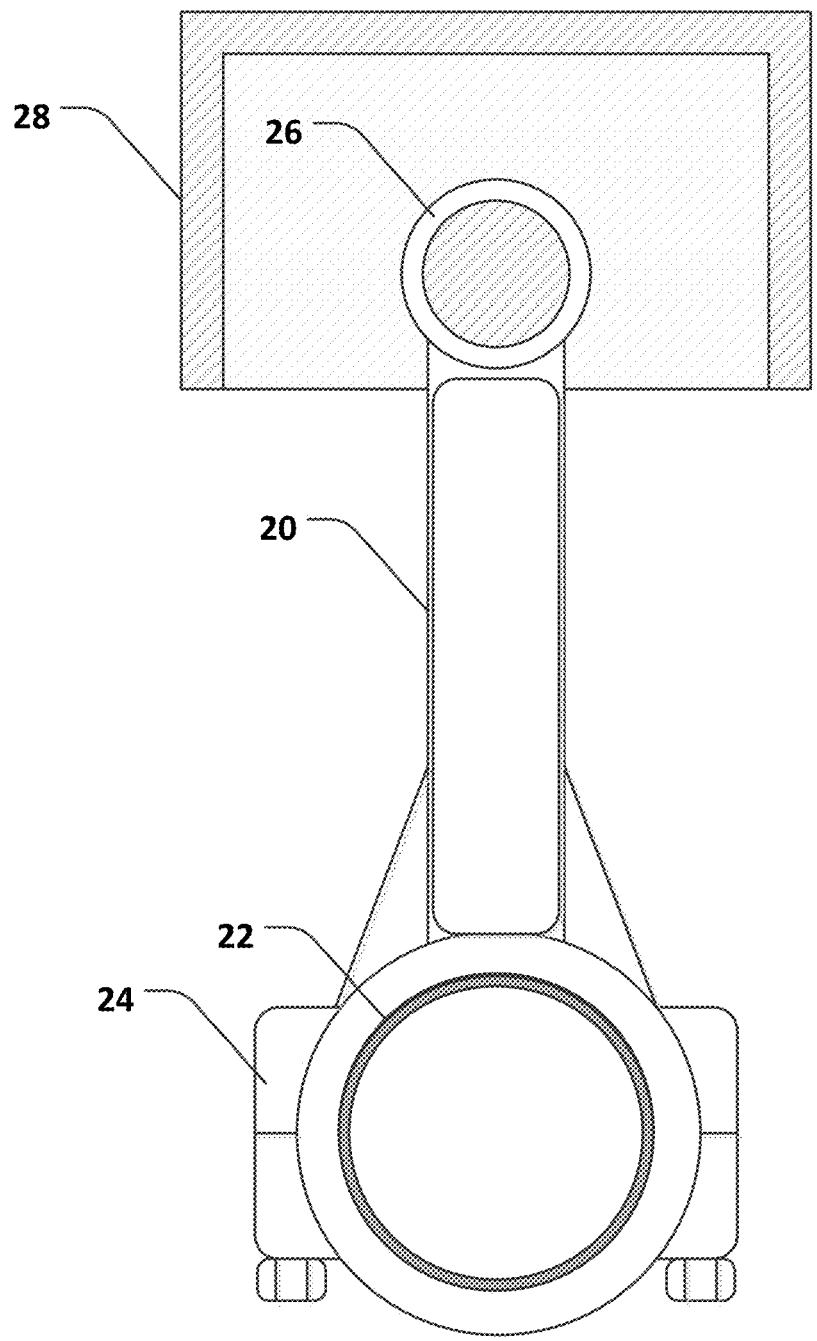
FIG. 2 illustrates a connecting rod and a big end bearing.

As noted above, combustion engines may exhibit loads in the range of 20 kN to 300 kN, including all values and ranges therein. FIG. 1a illustrates an example of a typical load history for a connection rod big end bearing in a 15 L heavy duty diesel engine at 2100 rpm (A), a 6.7 L heavy duty diesel engine at 3000 rpm (B), and a 2.3 L light duty boosted gasoline engine at 6,000 rpm (C). An embodiment of a big end bearing is illustrated in FIG. 2, wherein the big end bearing is a bearing 22 used in the end 24 of a connection rod 20 that opposes the end 26 of the connection rod 20 that is connected to a piston 28 in a combustion engine. The load applied to the big end bearing may, for example, be in the range of 50 kN to 275 kN depending on the type of engine. FIG. 1b illustrates a typical load rate of change for a connecting rod big end bearing in a 15 L heavy duty diesel engine at 2100 rpm (A), a 6.7 L heavy duty diesel engine at 3000 rpm (B), and a 2.3 L light duty boosted gasoline engine at 6,000 rpm (C). The rate of change in the load applied to the big end bearing in this embodiment may be in the range of +/−60 kN to +/−150 kN, depending on the type of engine.

Generally, in examining bearing wear, a bearing is installed in a testing apparatus which rotates the bearing while applying a relatively low frequency, sinusoidal load history to the bearing through the linear application of force against the bearing. The frequency may be up to 100 Hz, including all values and ranges from 1 Hz to 100 Hz. The rpm of the bearing may be in the range of 1,000 rpm to 6,000 rpm and the shaft on which the bearing is mounted may rotate eccentrically. In such a system, the bearing is subjected to static misalignment. These systems may be limited by an inability to apply relatively rapidly varying loads of sufficiently large forces. While solenoids, piezoelectric actuators and voice coils may provide relative rapid change, the force applied may not be sufficiently large enough to replicate loads applied in combustion engines. While mechanical and hydraulic systems may apply sufficient loads, these systems may not exhibit a sufficient rate of change of the applied loads.

Accordingly, room remains for improvement in achieving a testing system that may both apply sufficiently large forces at relatively rapid rates of change to better examine the operating conditions of bearings and lubricants in light and heavy duty internal combustion engine applications. Bearings of particular interest for these applications include crankshaft journal bearings and roller bearings for main journal support. The present disclosure provides an apparatus and method for examining such bearings for these applications as well as other applications, including railroad and marine applications.

Contemplated herein is an apparatus and method for generating and applying linear forces and, in particular, for replicating bearing loading conditions in internal combustion engines, wherein loads applied to a bearing may be in the range of 20 kN to 300 kN, including all values and ranges therein, at speeds of +/−20 kN/ms to +/−130 kN/ms including all values and ranges therein, such as in the range of +/−20 kN/ms to +/−100 kN/ms or +/−50 kN/ms to +/−100 kN/ms. The apparatus utilizes a common rail injection system, including a number of injectors, to supply a hydraulic fluid to a piston to generate linear movement. In embodiments, linear movement may be converted to angular motion as well. The operating pressure of the system may be 1,000 bar or greater, and preferably in the range of 2,000 to 3,000 bar, including all values and ranges from 1,000 bar to 3,000 bar. The injectors may supply the hydraulic fluid, at a pressure of 100 bar, at a flow rate of 1.00 L/min or greater, and preferably in the range of 1.5 L/min to 2.0 L/min, including all values and ranges from 0.5 L/min to 3.0 L/min.

Figure 3A:
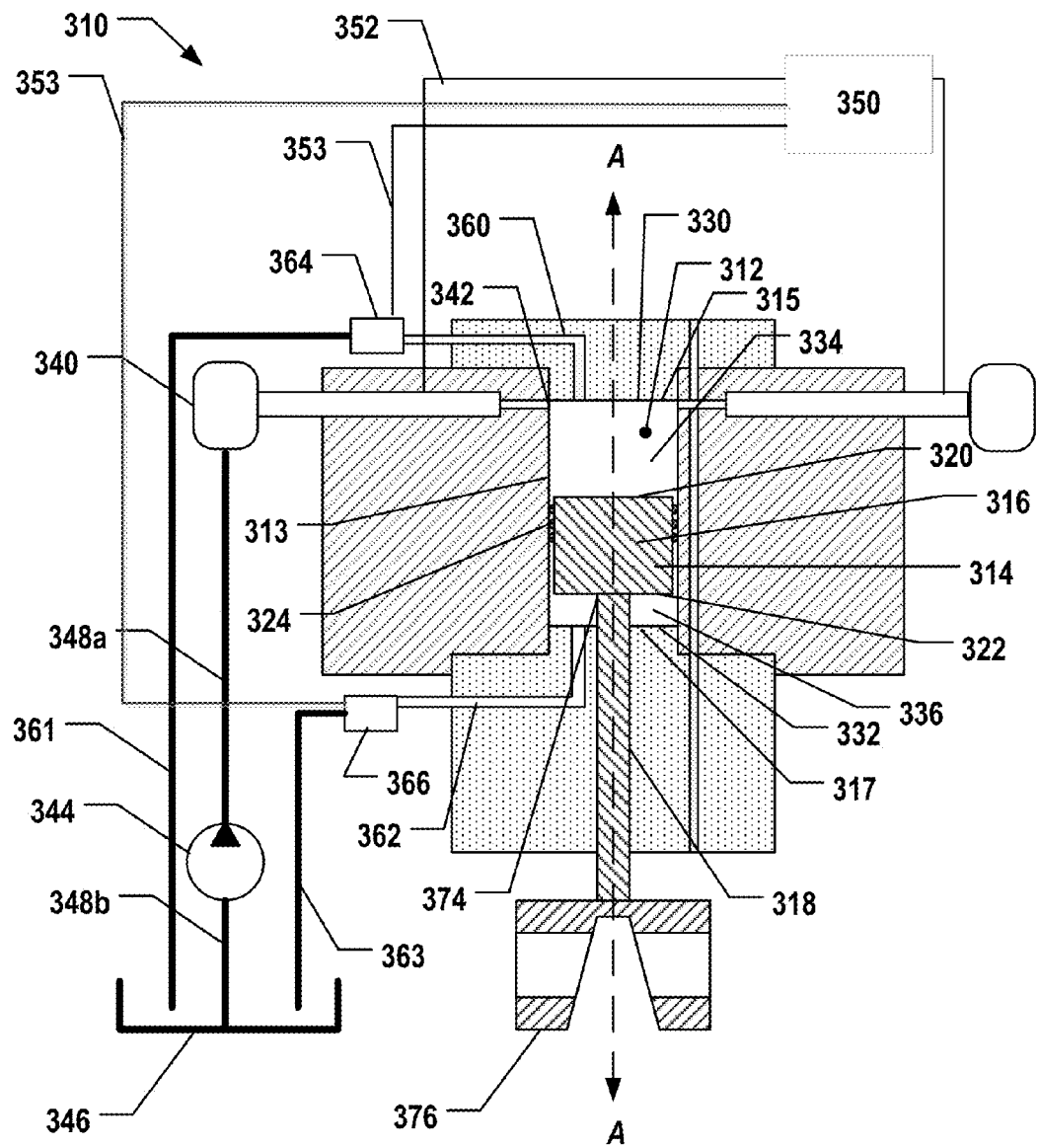
FIG. 3a illustrates a cross-sectional view of an embodiment of an apparatus for generating and applying linear forces taken along a longitudinal plane.
Figure 3B:
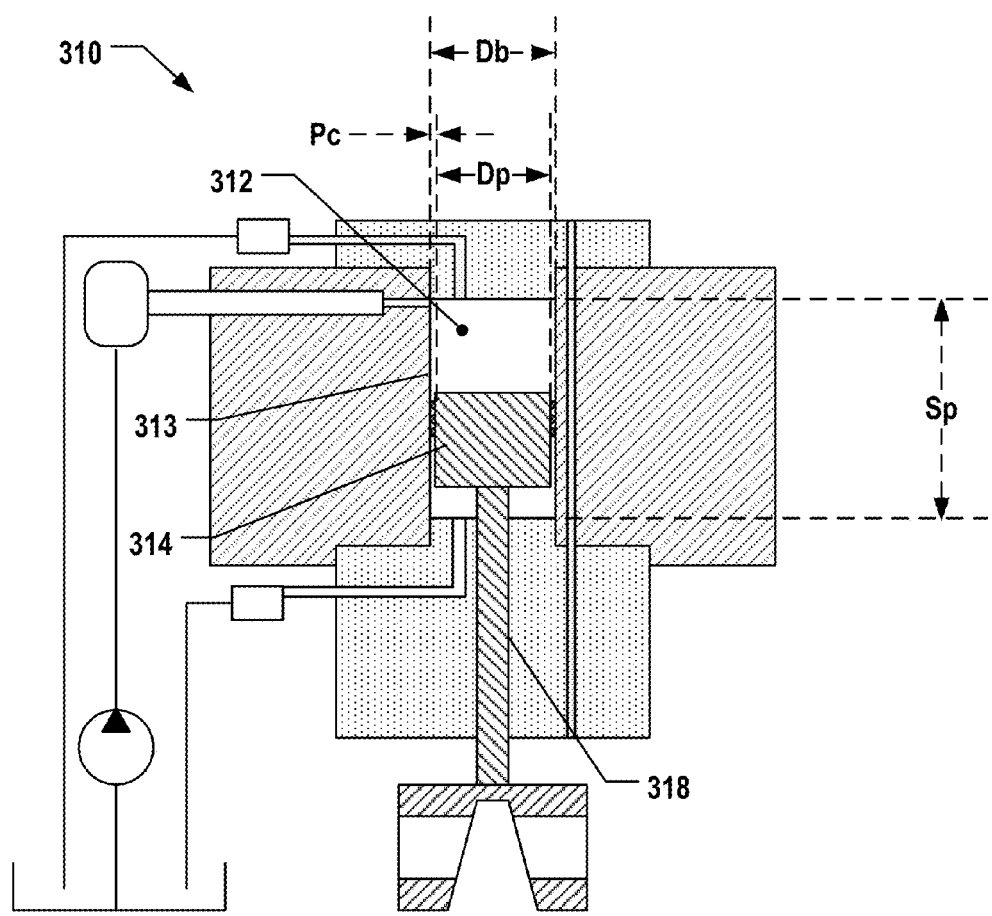

Referring to an embodiment of the apparatus illustrated in FIGS. 3a and 3b, the linear actuation apparatus 310 includes a piston bore 312, which extends longitudinally along axis A-A, and a piston 314. The piston 314 includes a piston head 316 located within the piston bore and a piston shaft 318 extending from the piston head 316. The piston head 316 provides a first surface 320 on one side of the piston head and a second surface 322 on the opposing side of the piston head 316, the surface area of the first surface being larger than the surface area of the second surface. The piston 314 may also include one or more seals 324 to prevent hydraulic fluid from flowing past the piston head 316.

The piston 314 is longitudinally displaceable along axis A-A in the piston bore 312 between a first end 330 of the piston bore 312 and a second end 332 of the piston bore 312. A first working volume 334 may be formed by the piston bore 312 and piston head 316, between the first end 330 of the piston bore 312 and the first surface 320 of the piston head 316. A second working volume 336 may be formed by the piston bore 312 and the piston head 316, between the second end 332 of the piston bore 312 and the second surface 322 of the piston head 316.

As the piston 314 is displaced the first and second working volumes are altered in size. The first working volume may exhibit a first volume in the range of 0.20 cm$^3$ to 25.0 cm$^3$, including all values and ranges therein. The second working volume may exhibit a second volume in the range of 0.20 cm$^3$ to 25.0 cm$^3$, including all values and ranges therein. Thus, when the piston 314 moves toward the second end 332 of the piston bore 312, the first working volume 334 is expanded, and when the piston 314 moves toward the first end 330 of the piston bore 312, the second working volume 336 is expanded.

The piston may be a single acting piston or a double acting piston. A single acting piston may be understood as a piston wherein the hydraulic fluid acts on one side of the piston only. A double acting piston may be understood as a piston wherein the hydraulic fluid acts on both sides of the piston, although not necessarily at the same time. In embodiments of either a single acting piston or a double acting piston, the piston 314 may be displaced by injecting hydraulic fluid into the first working volume 334, forcing the piston head 314 to move towards the second end 332 of the piston bore 312, increasing the first working volume 334 and decreasing the second working volume.

With reference to FIG. 3b, the longitudinal displacement, or stroke Sp, of the piston 314 may be in the range of 0.05 mm to 5.0 mm, including all values and ranges therein. Further, the piston head 316 may exhibit a diameter Dp in the range of 30 mm to 180 mm, including all values and ranges therein. A clearance C between the piston head 316 and the piston bore 312 may be in the range of 0.001 mm to 0.020 mm, including all values and ranges therein. The piston bore 312 may have a diameter Db in the range of 30 mm to 180 mm including all values and ranges therein.

The hydraulic fluid may exhibit a bulk modulus in the range of 5,000 bar to 100,000 bar at a temperature of 100° C. and a pressure of 500 bar. Hydraulic fluids may include mineral oil, water, glycol, esters, organophosphate ester, polyalphaolefin, propylene glycol, and silicone oils. Hydraulic fluids may include a number of other compounds or modifiers, such as corrosion inhibitors, anti-erosion additives, oils, butanol, esters (e.g. phthalates, like DEHP, and adipates, like bis(2-ethylhexyl) adipate), polyalkylene glycols (PAG), organophosphate (e.g. tributylphosphate), silicones, alkylated aromatic hydrocarbons, and polyalphaolefins (PAO) (e.g. polyisobutenes). In embodiments, the hydraulic fluid does not include fuels, such as gasoline, ethanol or diesel fuel.

With reference again to FIG. 3a, the hydraulic fluid is supplied to the first working volume through a common rail injection system. The common rail system includes a common rail 340 and a number of injectors 342 coupled to the common rail 340 and the piston bore 312. Hydraulic fluid is supplied to and stored in the common rail 340 at an elevated pressure, which may be in the range of 1,000 bar to 3,000 bar including all values and ranges therein, such as in the range of 2,000 bar to 3,000 bar. The common rail 340 supplies the injectors 342 with the hydraulic fluid at the elevated pressure. Hydraulic fluid may be supplied to the common rail 340 by a hydraulic pump 344 that maintains the elevated pressure in the common rail 340. In embodiments, the hydraulic fluid may be supplied from a reservoir 346 of hydraulic fluid. The common rail, pump and reservoir may be coupled either directly or indirectly to each other by a flow path formed, e.g., from pipes or hoses. The flow path 348a, 348b (hereinafter 348) may also include check values and safety valves preventing the loss in pressure of the hydraulic fluid in the common rail and overpressure of the hydraulic fluid above safe levels in the system.

As alluded to above, the injectors 342 may provide a flow path between the common rail 340 and the piston bore 312. The injectors may be openable and closable allowing regulation of the flow of hydraulic fluid into and out of the piston bore. The injectors 342 may be actuated, for example, by solenoids or piezos, and may be actuated by an electronic control unit 350. The injectors may be connected to the electronic control unit through electrical connections 352, as illustrated in FIG. 3a. Or, the injectors may be connected via wireless or infrared connections.

Figure 3C:
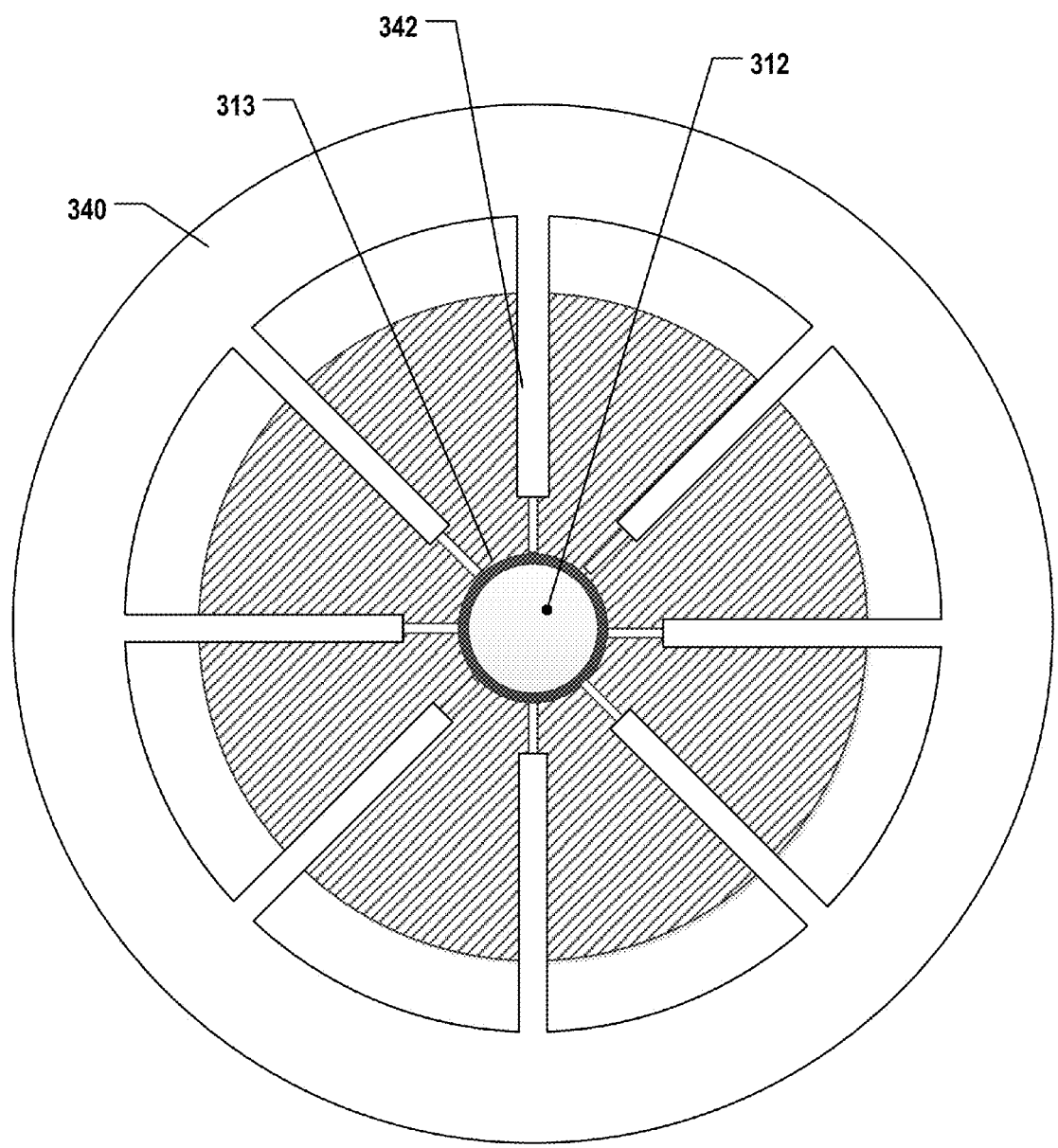
FIG. 3c illustrates a cross-sectional view of an embodiment of a common rail and injectors for the apparatus of FIG. 3a taken along a lateral plane.

FIG. 3c illustrates six injectors 342 arranged radially around the longitudinal axis of the piston bore. While the injectors 342 are illustrated as being evenly spaced around the bore, the spacing between the injectors may be uneven as well. In embodiments, 2 to 10 injectors may be present. In addition, while the injectors 342 are illustrated in FIG. 3a as being located at the same height of the piston bore around the longitudinal axis, the injectors 342 may be located at different heights around the longitudinal axis as well. It is also noted that while the injectors 342 are illustrated as being coupled at the piston bore side walls 313, the injectors may additionally or alternatively be coupled at upper or lower bore walls 315, 317 at the first end 330 and second end 332 of the piston bore 312, respectively.

Figure 4:
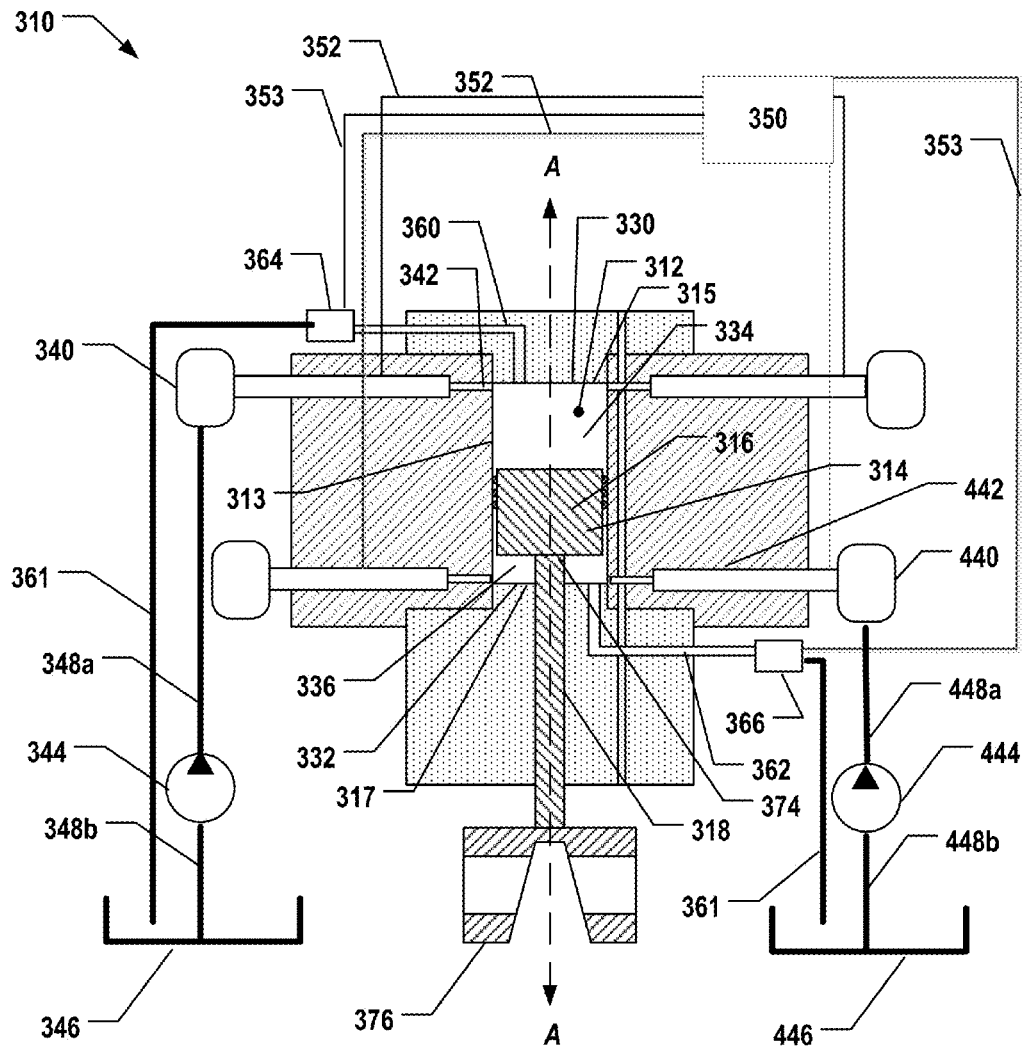
FIG. 4 illustrates a cross-sectional view of another embodiment of an apparatus for generating and applying linear forces taken along a longitudinal plane.

FIG. 4 illustrates a double acting system. In addition to the first set of injectors 342 coupled to the first working volume 334, a second set of injectors 442 may be coupled to the second working volume 336. As illustrated, the second set of injectors 442 are coupled to a second common rail 440. The second plurality of injectors 442 may provide an openable and closable flow path between the common rail 440 and the second working volume 336. The second set of injectors may be similar to the first set of injectors described above and the opening and closing of the injectors 442 may be controlled by the electronic control unit 350. As illustrated, a second hydraulic pump 444 and a second hydraulic fluid reservoir 446 may be present and coupled to the second common rail 440 to provide hydraulic fluid to the second common rail 440 through a second flow path 448a, 448b (hereinafter 448).

Similar to the embodiment of FIGS. 3a through 3c, the hydraulic fluid may be stored in the second common rail 440 at an elevated pressure, such as in the range of 1,000 bar to 3,000 bar, including all values and ranges therein. In embodiments, the elevated pressure of the second common rail 440 may be greater than the elevated pressure of the first common rail 340. Alternatively, the elevated pressure of the second common rail 440 may be the same as the first common rail 340 or less than the elevated pressure of the first common rail 340. Injecting hydraulic fluid into the second working volume 336 through the second set of injectors 342 may force the piston head 336 towards the first end 330 of the piston bore 312, enlarging the second working volume and reducing the first working volume 334. The double acting piston may exhibit similar dimensions as discussed above with regard to the piston of FIGS. 3a and 3b, such as first and second working volume, stroke piston head diameter, piston bore diameter, clearance, etc.

In further embodiments, a single common rail, such as common rail 340, may be used to supply hydraulic fluid to both the first plurality of injectors and the second plurality of injectors, where both the first injectors and second injectors are coupled to the common rail. Further, in embodiments, a single hydraulic pump may be used to supply hydraulic fluid to more than one common rail from a single reservoir. In such embodiments, where a single hydraulic pump may be used, the first and second common rails may be held at different pressures by incorporating pressure regulation valves in the flow paths between the first hydraulic pump and the first and second common rails.

Referring to FIGS. 3a and 4, in one embodiment, a first drain 360 may be coupled to the first working volume 334 and a second drain 362 may be coupled to the second working volume 336. As one working volume increases in size due to the introduction of hydraulic fluid, the other working volume decreases in size. The drains allow for hydraulic fluid present in the decreasing working volume to be removed. To prevent pressure losses when hydraulic fluid is introduced into a particular working volume, the drains may be coupled to solenoid or piezo-operated valves 364, 366, which may be controlled by the electronic control unit 350 and are in electrical communication, such as by electrical wires 353, or wireless communication therewith. In alternative embodiments, instead of a solenoid or piezo-operated valve, a relief valve may be provided that opens upon reaching the elevated pressure, or a pressure within 5% of the elevated pressure of the common rail. Thus, e.g., when hydraulic fluid is injected into the first working volume 334, the valve 366 for the second drain 362 opens to release hydraulic fluid that may be present in the second working volume 336.

Figure 5:
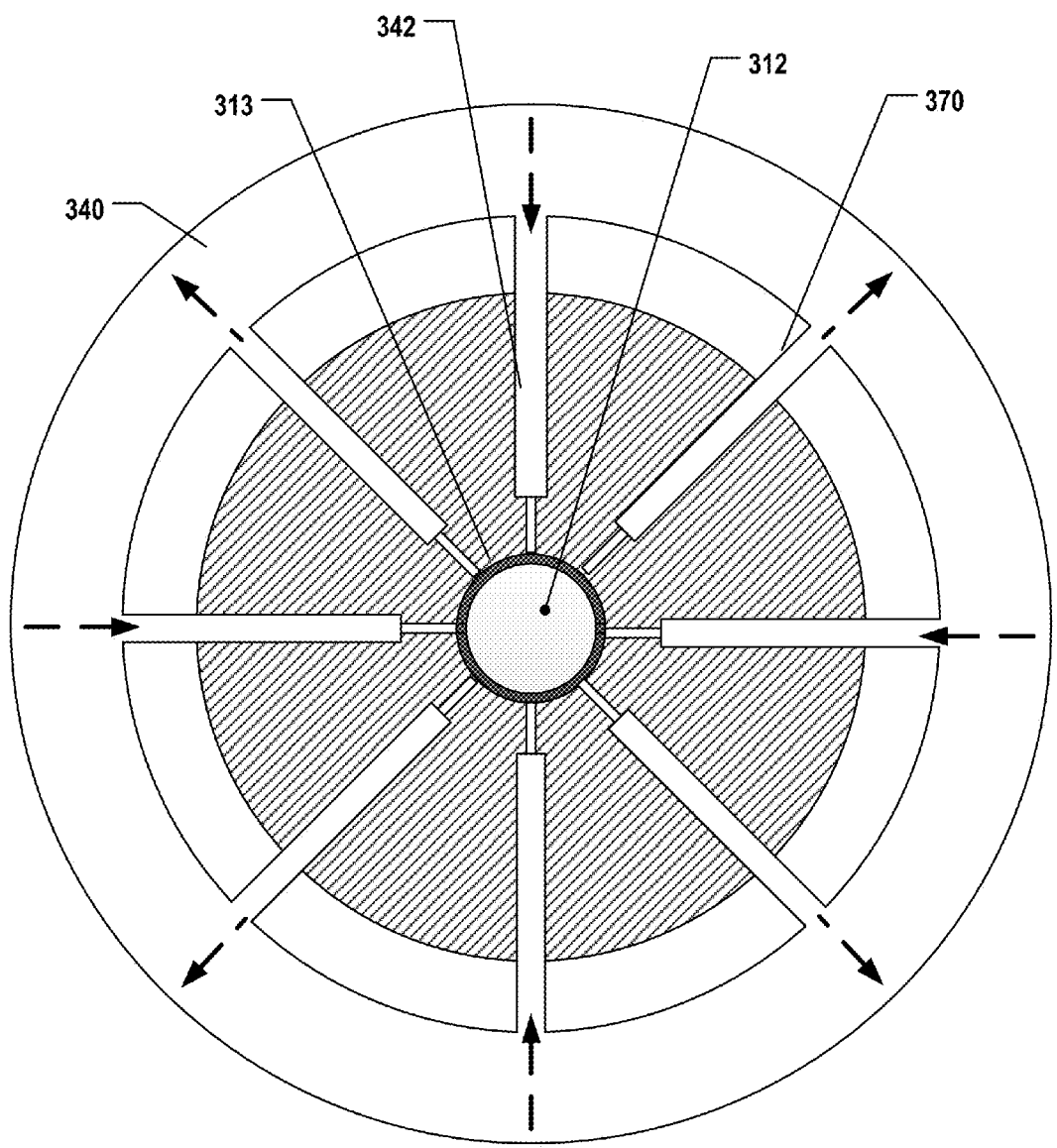
FIG. 5 illustrates a cross-sectional view of an embodiment of a common rail and injectors for the apparatus of FIG. 3a or FIG. 4 taken along a lateral plane.
Figure 6:
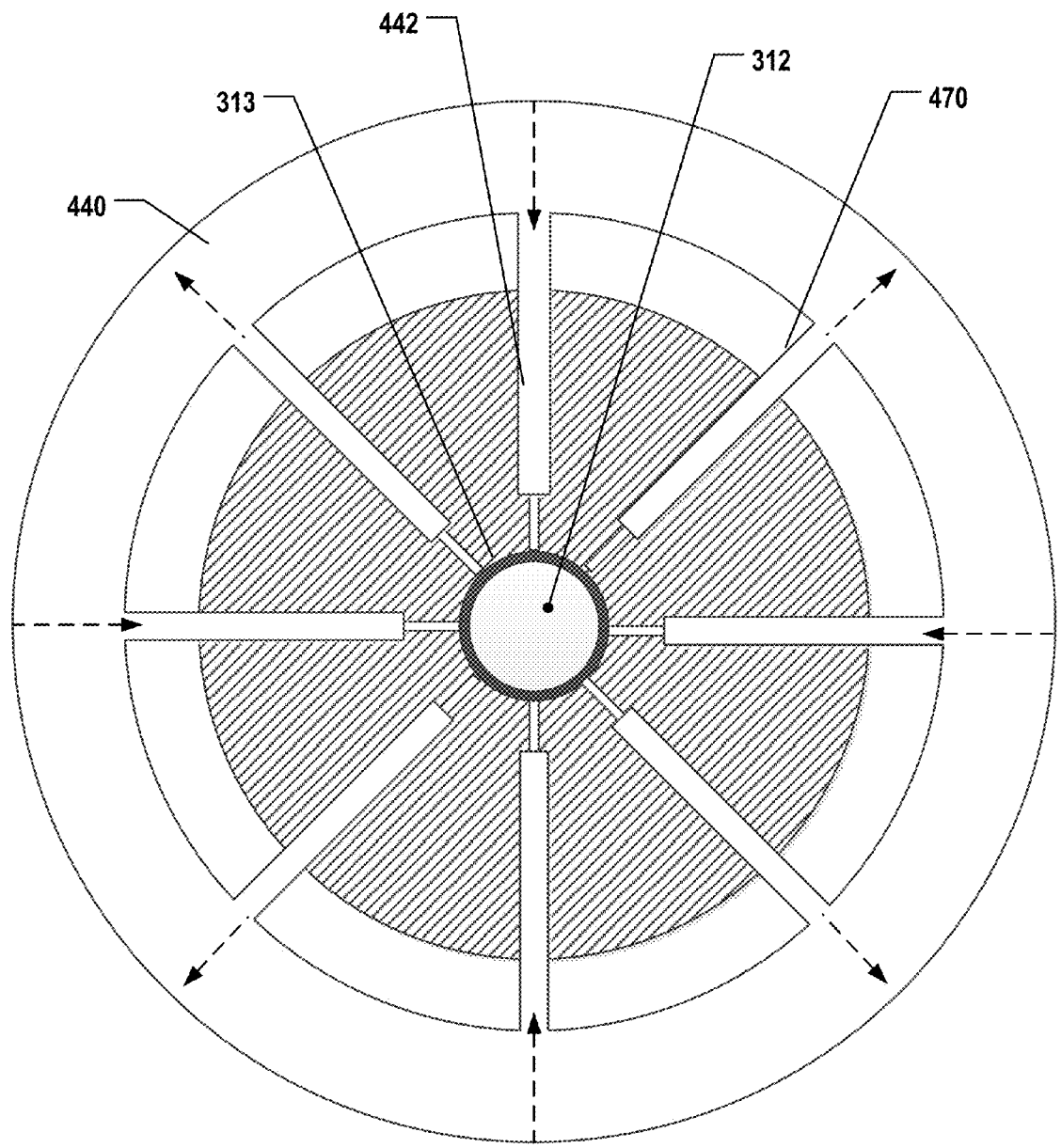
FIG. 6 illustrates a cross-sectional view of an embodiment of a common rail and injectors for the apparatus of FIG. 4 taken along a lateral plane.

In addition to or alternatively to the drains described above, given that the flow of hydraulic fluid may occur in only one direction through the injectors, a third set of injectors may be provided to remove hydraulic fluid from the first working volume and, optionally, a fourth set of injectors may be provided to remove hydraulic fluid from the second working volume. FIG. 5 illustrates an embodiment where a third set of injectors 370 are provided to evacuate hydraulic fluid from a first working volume 334 and FIG. 6 illustrates an embodiment wherein a fourth set of injectors 470 are provided to evacuate hydraulic fluid from a second working volume 336. The arrows provided on the figures represent the direction of flow for the injectors. As illustrated, the third and four sets of injectors may be alternated with the first and second set of injectors. The injectors may be controlled by the electronic control unit and opened when hydraulic fluid enters the working volume opposing the working volume the injectors are coupled to.

The first and second drains, and or third and fourth set of injectors, may be coupled to the hydraulic fluid reservoirs 346 or 446, which provide a receptacle for the hydraulic fluid removed from the working volumes. As illustrated in FIG. 3a, flow paths 361, 363 connect the drains 360, 362 to reservoir 346. As illustrated in FIG. 4, flow path 363 connects drain 362 with reservoir 446 and flow path 361 connects drain 360 with reservoir 346. Additional arrangements may be envisioned, including providing flow paths coupling drains 360, 362 to reservoir 346 and connecting reservoir 346 to reservoir 446 to supply hydraulic fluid to reservoir 446.

In either single or double acting embodiments, to generate and apply a linear force, hydraulic fluid may be supplied to either working volume causing the piston head and the piston shaft to extend and retract in the piston bore. For example, when hydraulic fluid is supplied to the first working volume 334, the piston shaft 318 may extend through the lower piston bore wall 317. The first end of the piston shaft 374 is coupled to the piston head 314 and the second end of the piston shaft 376 is associated with a bearing so as to apply a force to the bearing. When hydraulic fluid is supplied to the second working volume 336, the piston shaft 318 may be retracted through the lower piston bore wall 317.

In embodiments of the single and double acting piston described above, the rate of travel of the piston in extension, or retraction if a double acting piston, may be such as to generate a force variation of in the range of +/−20 kN/ms to +/−130 kN/ms, including all values and ranges therein including +/−20 kN/ms to +/−100 kN/ms or +/−50 kN/ms to +/−100 kN/ms. Further, the piston may apply a force of 1 kN to 300 kN, including all values and ranges therein. In addition, the electronic control unit may trigger multiple injections through the course of injecting hydraulic fluid into either the first or second working volumes. That is, hydraulic fluid may be introduced into the working volume in multiple stages. Different engine speeds and sizes may be simulated by altering the injection pressure and switching injectors on and off.

The rate at which the piston travels may be controlled by a number of factors, including but not limited to, the rate in which the hydraulic fluid is introduced into the working volume, the duration in which the injector remains open, the rate at which hydraulic fluid is evacuated from the opposing working volume. Furthermore, system pressure may be regulated by the hydraulic pump coupled to the common rail, the settings of any valves present between the hydraulic pump and the common rail, and the pressure at which the common rail is maintained. These factors may be regulated by the electronic control unit as well as by limits of the equipment itself.

As discussed further below, in one embodiment, the piston shaft of the above apparatus may directly impinge on a bearing while the bearing is rotated on an eccentric spindle or a zero eccentric spindle. Using a spindle with zero eccentricity minimizes the volume of fluid to be displaced in order to generate the required load. In another embodiment, the piston shaft may be pivotably connected to a connection rod and the bearing may be mounted in the connection rod. Additional arrangements of the linear actuator relative to a test bearing are contemplated as well.

Figure 7A:
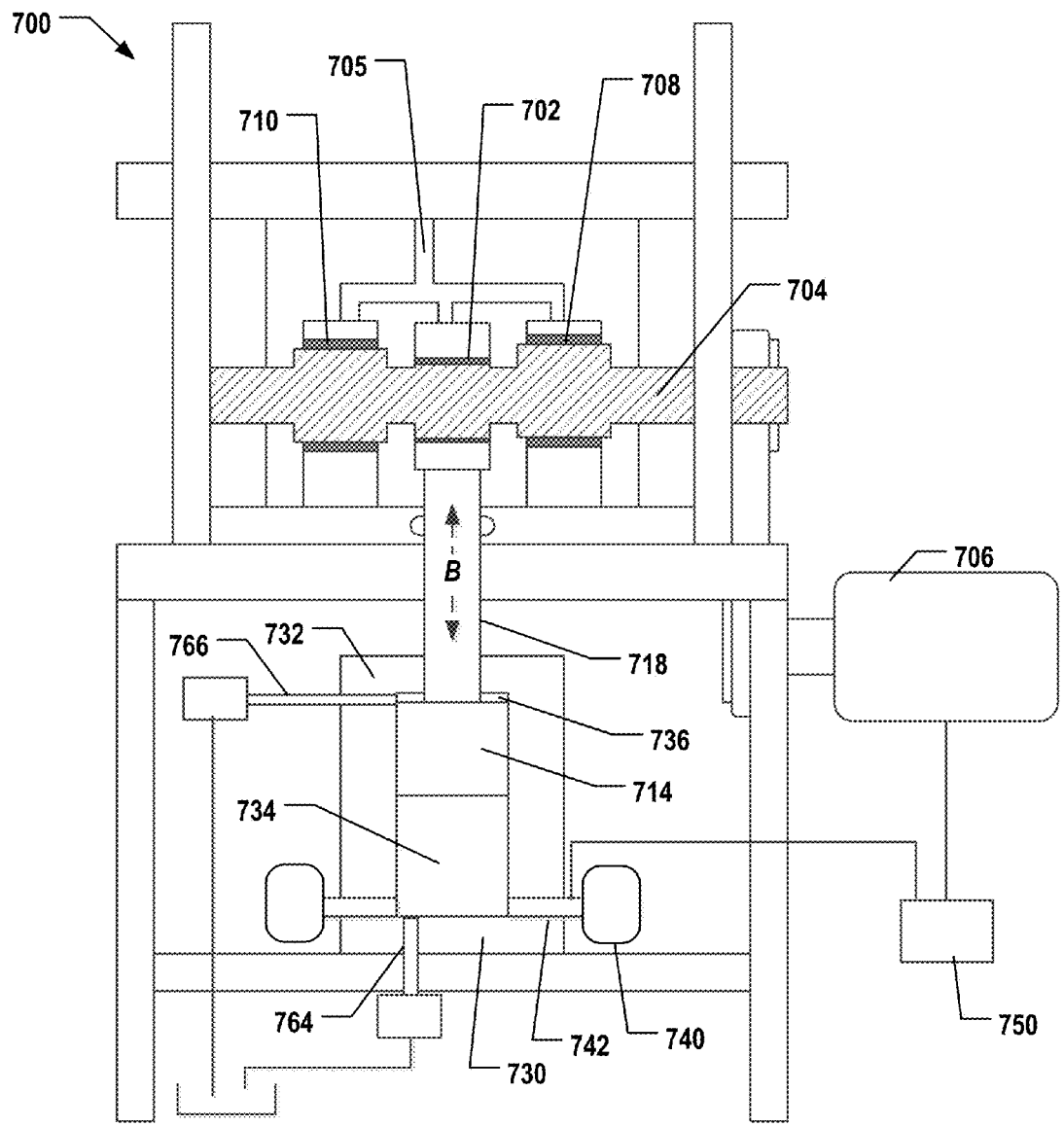
FIG. 7a illustrates a cross-sectional view of an embodiment of an apparatus for testing a bearing.
Figure 7B:
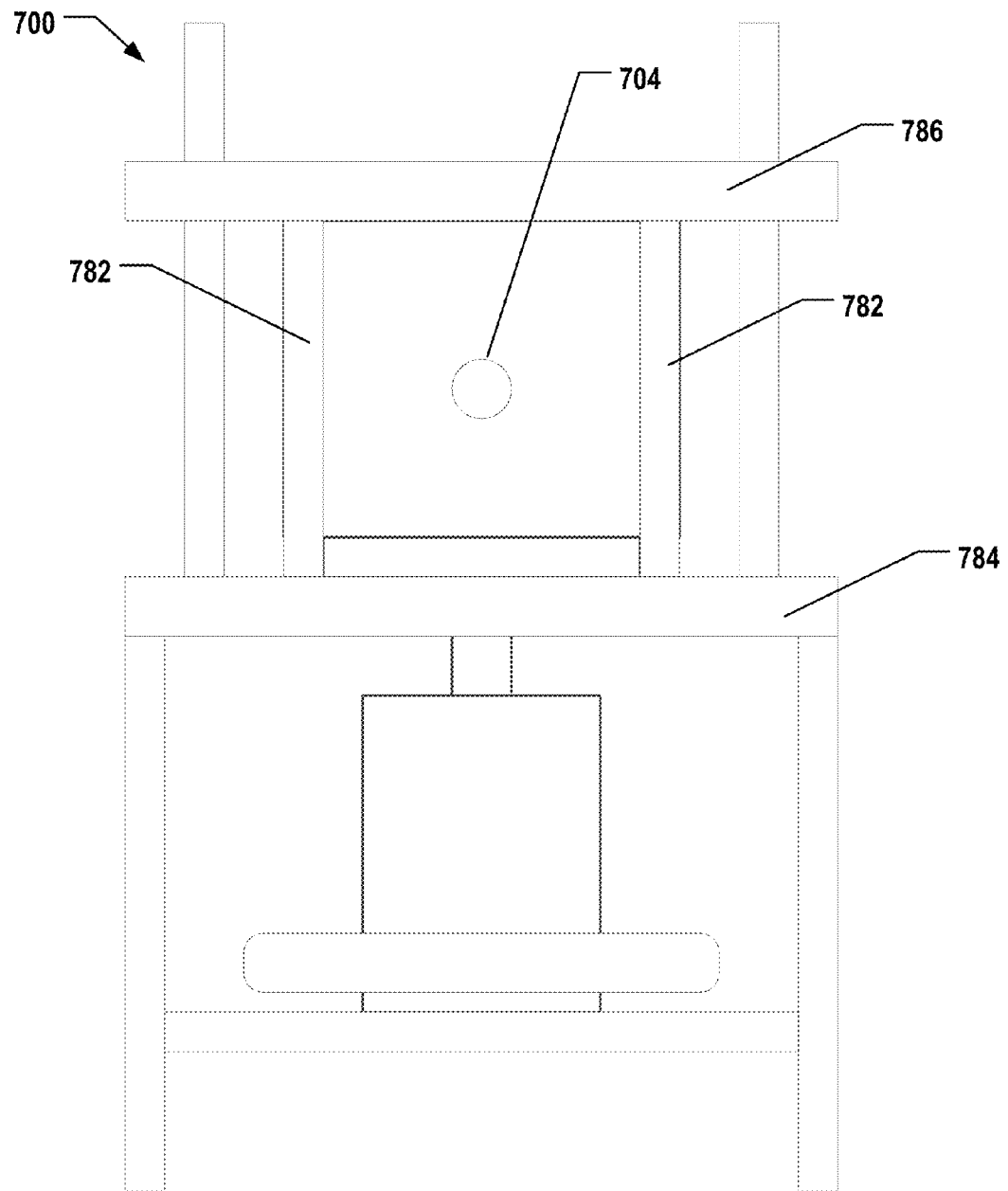
Figure 8A:
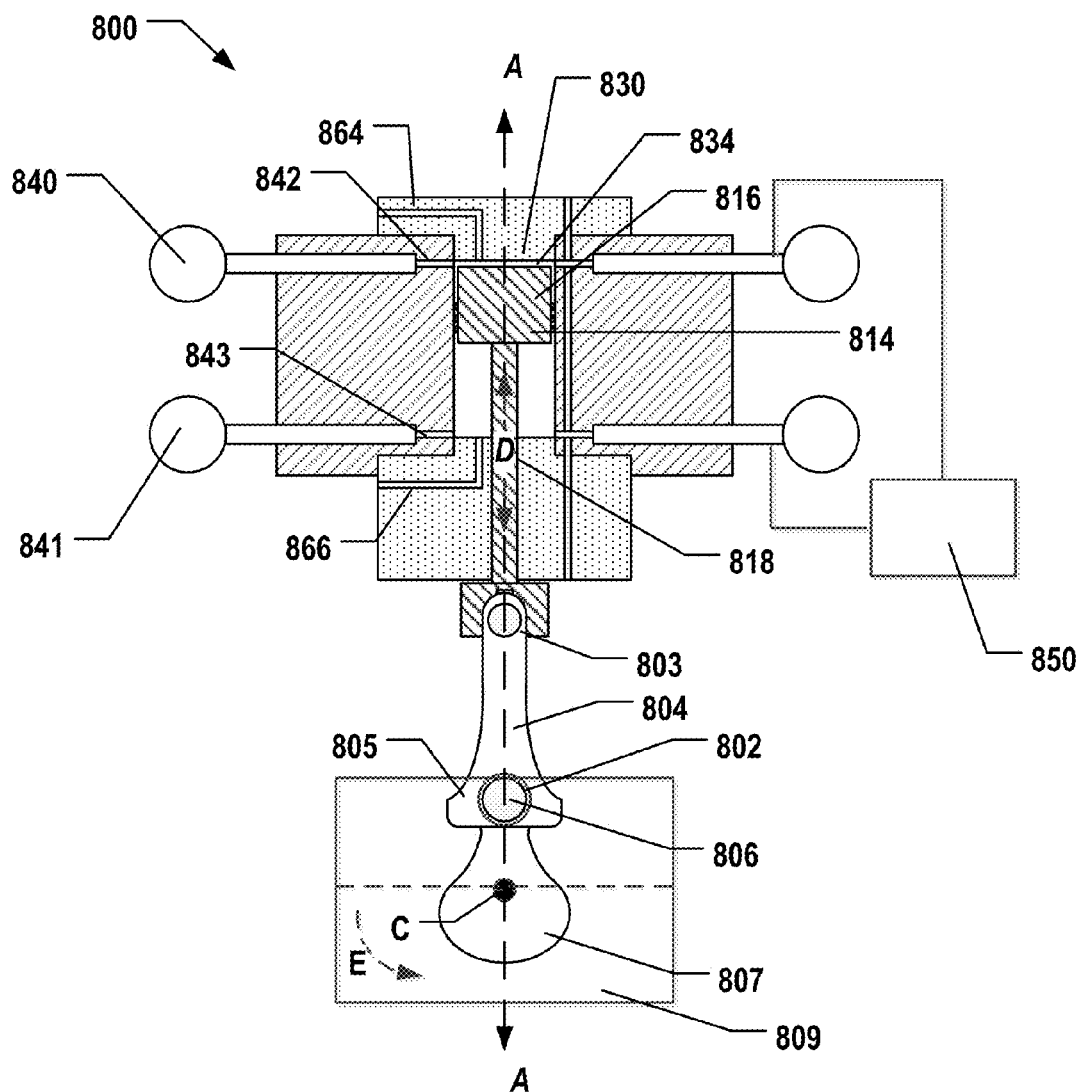
FIG. 8a illustrates an embodiment of an apparatus for testing a bearing.
Figure 8B:
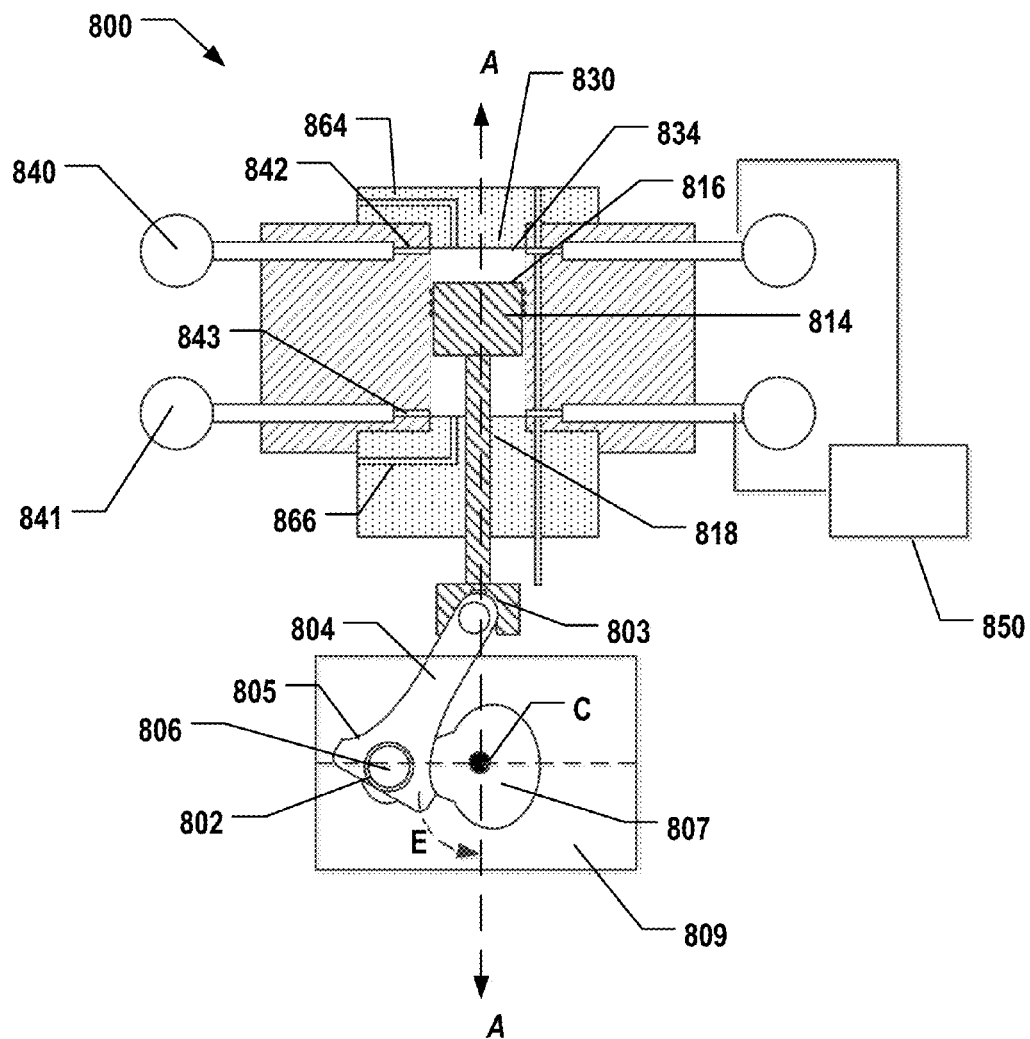
FIG. 8b illustrates the apparatus of FIG. 8a as the connecting rod is pivoted and the arm rotates.
Figure 8C:
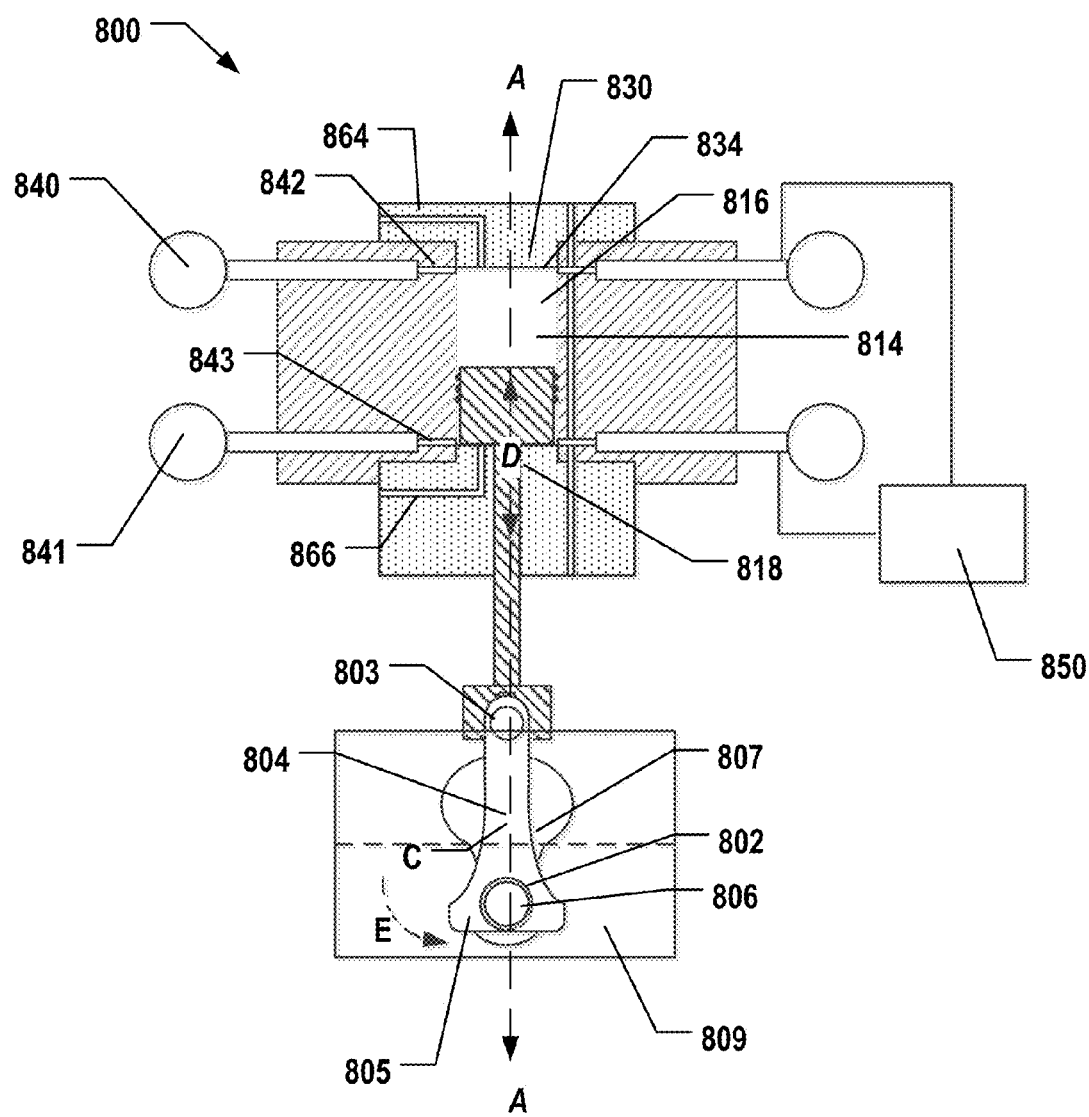
FIG. 8c illustrates the apparatus of FIG. 8a as the connecting rod is pivoted and the arm rotates.
Figure 8D:
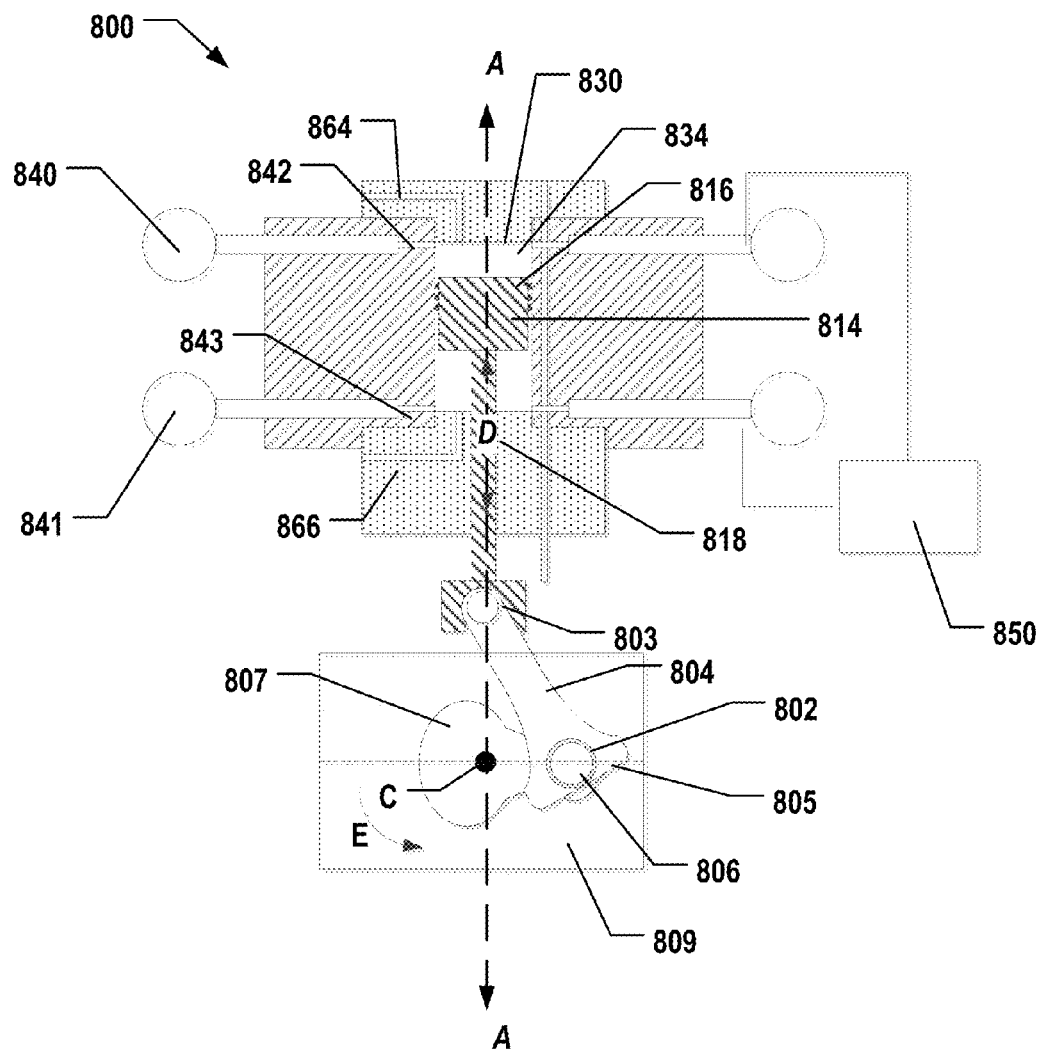
FIG. 8d illustrates the apparatus of FIG. 8a as the connecting rod is pivoted and the arm rotates.

FIGS. 7a and 7b illustrate an embodiment where the piston described above is incorporated into a testing apparatus 700 that applies a linear force to a bearing 702. With reference to FIG. 7a, the bearing 702 may be mounted on a spindle 704. A lubricant may be added to the bearings through a lubricant supply inlet 705. The spindle 704 may be rotated by an electric motor 706 at an rpm in the range of 3,000 to 5,000 rpm, including all values and ranges therein. Further, the portion of the spindle 704 on which the bearing is mounted may rotate in an eccentric manner. On either side of the bearing 702 to be tested, the shaft may be supported by additional bearings 708, 710.

The piston shaft 718 may reciprocate up and down as indicated by arrow B and directly impinging the bearing 702. The piston shaft 718 may be held against the bearing 702 or the piston shaft 718 may be reciprocated to impinge on the bearing at a given frequency. Rotation of the spindle 704 and actuation of the piston 718 may be controlled by the electronic control unit 750, which in embodiments may be the same electronic control unit that controls the injectors, hydraulic pump and drain valves discussed above (see 350 in FIGS. 3a and 4). The electronic control unit 750 may dictate the rate of rotation of the spindle 704 and the force and rate at which the piston 718 is actuated. To insure that the piston shaft 718 contacts the bearing, the piston shaft 718 may be configured to extend to the spindle 704 and interfere with the spindle by 0.1 mm to 5 mm, including all values and ranges therein.

To apply pressure against the bearing 702, the electronic control unit 750 may open the first set of injectors 742 and hydraulic fluid may flow into the first working volume 734 from the common rail 740 at an elevated pressure. The first drain 764 may be closed to prevent hydraulic fluid from escaping the first working volume 734. Due to an increase in pressure, the piston head 714 and piston shaft 718 may be pushed away from the first end of the piston 730 and towards the second end of the piston bore 732, increasing the first working volume 734. This causes the piston shaft 718 to extend towards and impinge upon the bearing 702. If present, the hydraulic fluid present in the second working volume 736 may be released through the second drain 766. The piston 714 may be retracted by opening the first drain 764 with the electronic control unit 750 and forced back by recovery of the bearing 702 and lubricant. Or, in the case of a double acting piston, the piston 730 may be forced back by providing hydraulic fluid to the second working volume 736.

With reference to FIG. 7b, the testing apparatus may be supported by a testing frame 780, wherein the testing frame may side plates 782 for stiffening the testing apparatus, a testing table 784 upon which the testing apparatus 700 is placed, and a retaining plate 786 for retaining the testing apparatus 700 in place. In the above embodiments, the testing apparatus 700 may be designed to exhibit relatively low deflection, such as from 0.5 mm to 1.0 mm, including all values and ranges therein at a load in the range of 290 kN to 310 kN.

In addition to the linear testing apparatus described above, FIGS. 8a through 8d illustrate another embodiment of a testing apparatus where the linear action of the piston described above is translated into a rotational motion. The piston 814 is incorporated into a testing apparatus 800 that rotates the bearing and applies forces to the bearing in a manner similar to that in a crankcase. A connecting rod 804 may be coupled to the piston shaft 818 in a pivotable manner at a first end 803, allowing the connecting rod to swing relative to axis A-A. The bearing 802 may be mounted in the opposite end 805 of the connecting rod 804. The bearing 802 may also be positioned around a spindle 806 that is mounted on a rotating arm 807, which may optionally be weighted. The arm may rotate around an axis (illustrated by point C), which is perpendicular to axis A-A as well the reciprocating motion of the piston indicated by arrow D. The bearing is thus constrained by both the connecting rod 804 and the spindle 806. A lubricant may be added to the bearings through contact of the bearing 802 with the lubricant 809.

As the piston shaft 818 reciprocates up and down (arrow D), the connecting rod 804 rotates the arm 807 around axis C as represented by arrow E. During rotation, the connecting rod 804 and the spindle 806 impinge on the bearing 802 simulating impingement of the connecting rod and crankshaft during engine operation. Reciprocation of the piston 814 and rotation of the arm 807 may be controlled by the electronic control unit 850, wherein the electronic control unit 850 dictates that rate of reciprocation and the forces applied by the piston 814. The arm 807 may rotate at a rate of 1,000 to 5,000 rpm, including all values and ranges therein, such as 2,000 rpm to 3,000 rpm.

To reciprocate the piston, the electronic control unit 850 may open the first set of injectors 842 and hydraulic fluid may flow into the first working volume 834 from the common rail 840 at an elevated pressure. The first drain 864 may be closed to prevent hydraulic fluid from escaping the first working volume 834. Due to an increase in pressure, the piston head 816 and piston shaft 818 may be pushed away from the first end 830 of the piston bore and towards the second end of the piston bore 832, increasing the first working volume 834. This causes the piston shaft 818 to extend towards point C, forcing the crankshaft 804 to pivot and rotate around point C. If present, the hydraulic fluid present in the second working volume 836 may be released through the second drain 866. The piston 814 may be retracted by opening the first drain 864 with the electronic control unit 850 and forced back by the injection of hydraulic fluid into the second working volume 836 through common rail 841 and injectors 843. In the case of a single acting piston, the piston may be forced back the recovery of the bearing 802 and lubricant.

It is contemplated that the arrangement above may allow for use of actual parts, such as connecting rods, that are utilized in the engines of interest. For example, standard connecting rods may be used with a concentric spindle (with zero eccentricity). Or, standard connecting rods may be used with eccentric spindles. Modified parts may be utilized taking into account changes in deflection and surface wear characteristics. Furthermore, alterations maybe made to mimic eccentricity and crankshaft wear.

Conventional hydraulic systems are generally understood as operating at only a few hundred bar, requiring relatively large areas to generate necessary forces and requiring relatively large oil flow rates. It may be appreciated that in using the common rail injectors for metering the flow of the hydraulic fluid into the piston, relatively high operating pressures in the range of 2,000 bar to 3,000 bar may be achieved. Further in use of the common rail system to actuate the piston, relatively short injection time, multistrike action, and sizeable flow rates may be achieved. Further, in minimizing the amount of oil in the system and in designing the rig to be stiff, the rig maybe capable of producing load levels and dynamics of HD engines.

EXAMPLE

Feasibility calculations were performed to evaluate the testing apparatus described in FIGS. 7 and 7b above. The bearing of interest was a Cummins ISX 15 big end bearing and therefore, the geometry of a Cummins ISX 15 engine was used in testing. The bore of the engine is 137 mm, the stroke is 169 mm, the piston mass is 5.8471 kg, max speed is 2100 rpm, and peak cylinder pressure is 230 bar. The peak cylinder pressures were tested at speeds of 2100 rpm and were larger than the actual values recorded in the engine, allowing for overloaded conditions to be tested. Light duty common rail injectors having a pressure rating of 2,000 bar and a flow rating of 1.25 L/min at 100 bar differential pressure was used.

Figure 9A:
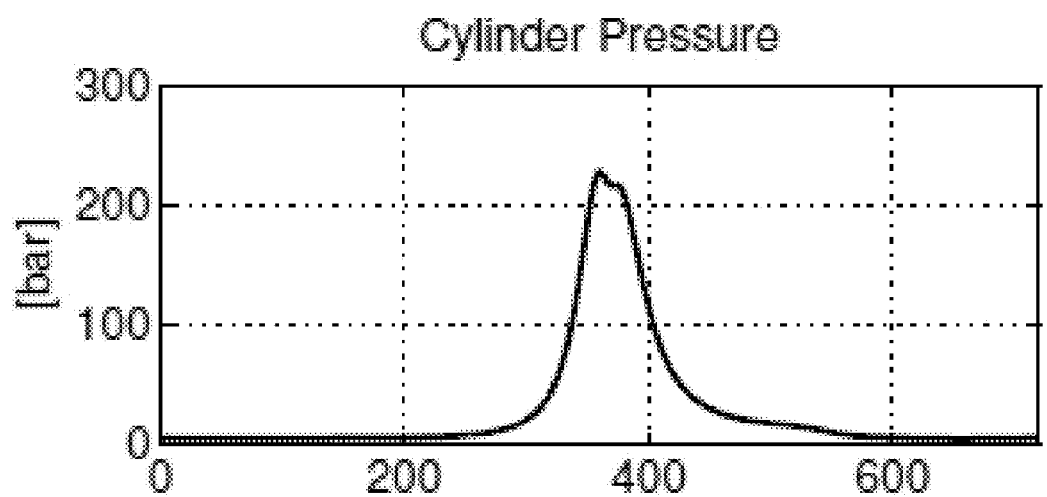
FIG. 9a illustrates cylinder pressure as the crank angle progresses.
Figure 9B:
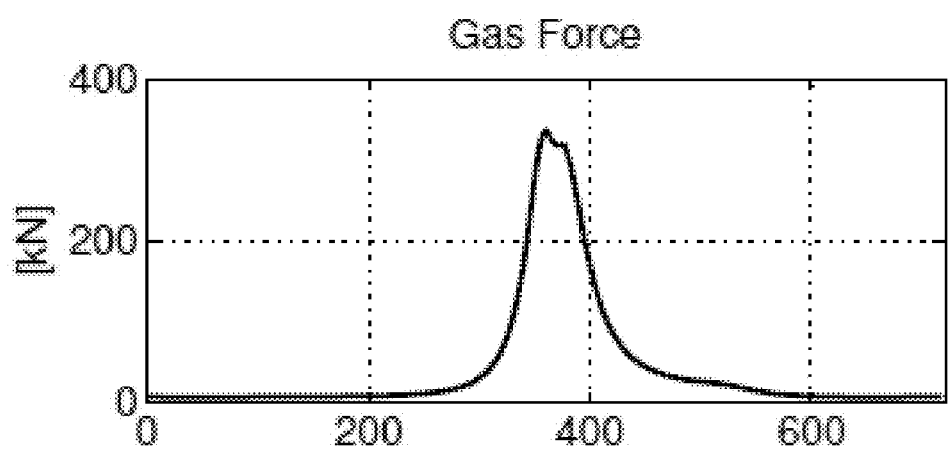
FIG. 9b illustrates the gas force as the crank angle progresses.
Figure 9C:
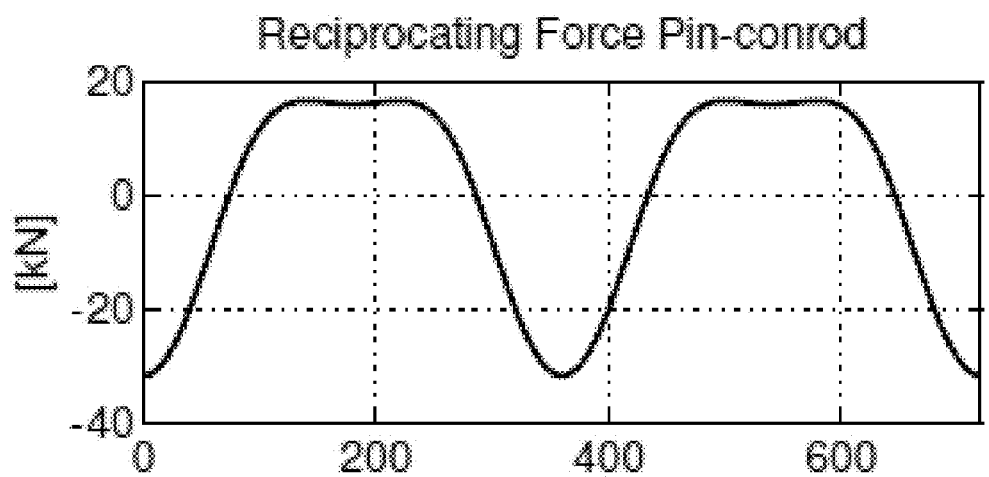
FIG. 9c illustrates the reciprocating force as the crank angle progresses.
Figure 9D:
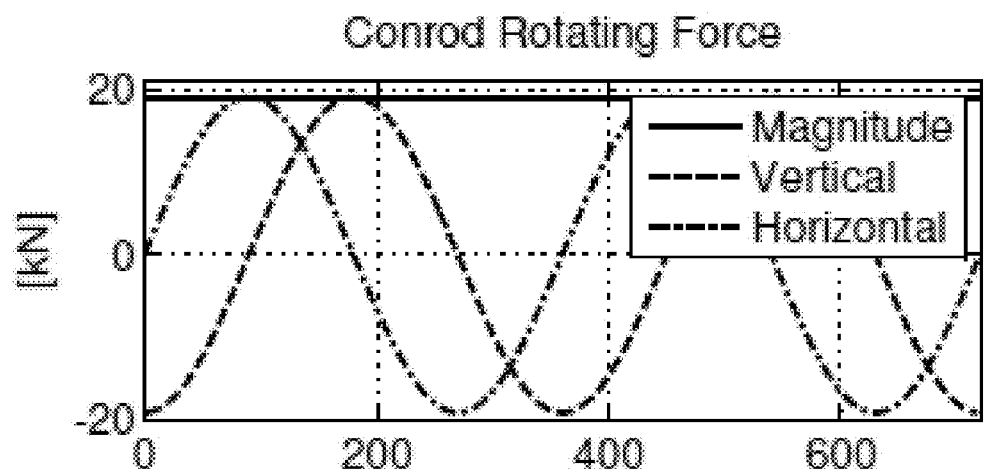
FIG. 9d illustrates the connecting rod rotating force as the crank angle progresses.
Figure 9E:
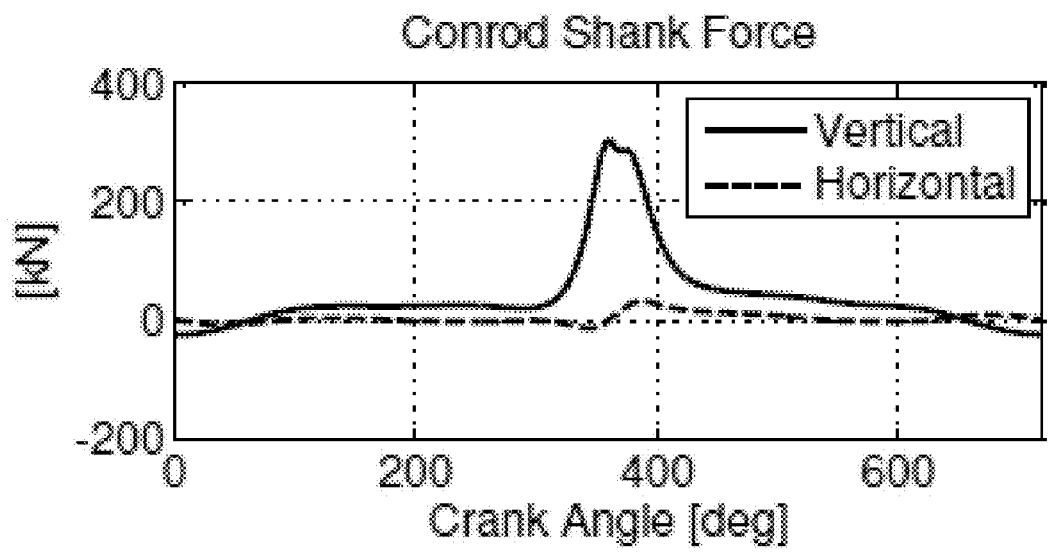
FIG. 9e illustrates the connecting rod shank force as the crank angle progresses.
Figure 9F:
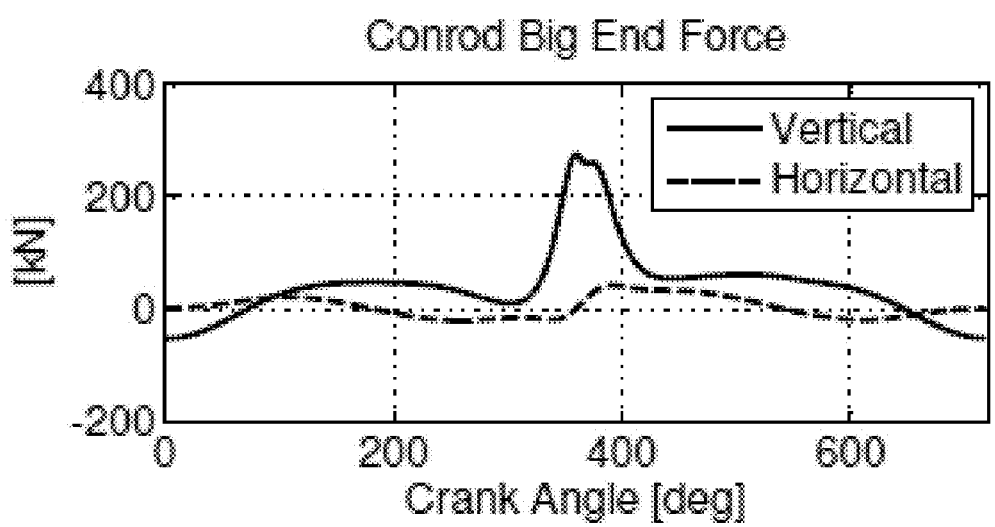
FIG. 9f illustrates the connecting rod big end force as the crank angle progresses.

FIGS. 9a through 9f illustrate the engine load calculations. FIG. 9a illustrates the change in cylinder pressure (the pressure in the piston cylinder bore) over crank angle, the cylinder pressure is illustrated as reaching 230 bar. FIG. 9b illustrates the change in gas force, or the force acting on the piston, through the crank angles, the force reaching around 320 kN. FIG. 9c illustrates reciprocating forces of the pin-conrod (the piston head pin that fits through the top of the connecting rod and piston to hold them together) through the crank angles when operating at 2100 rpm. FIG. 9d illustrates the centrifugal forces at the connecting rod big end through the crank angles when operating at 2100 rpm. FIG. 9e illustrates the shank force with respect to the connecting rod reference through the crank angles, indicating that vertical stress approaches its max when the cylinder pressure and gas force are near its max. FIG. 9f illustrates the bearing force at the big end (fixed reference system) through the crank angle. Similar to FIG. 9e, the graph indicates that the vertical stress approaches its max when the cylinder pressure and gas force are near its max.

Figure 10A:
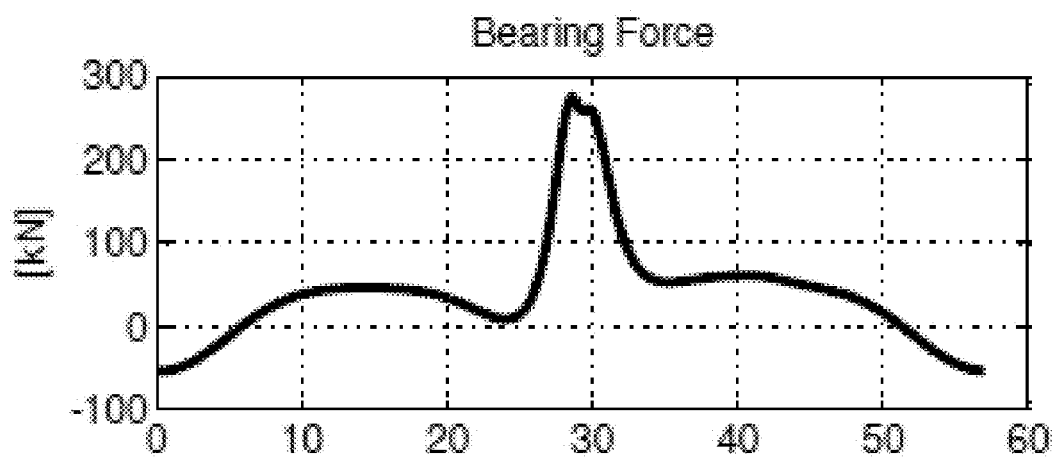
FIG. 10a illustrates bearing force over time.
Figure 10B:
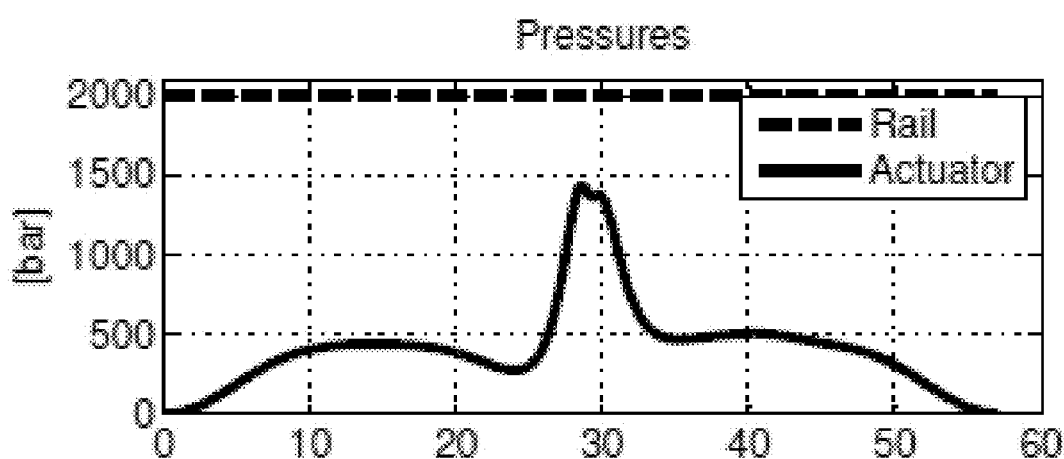
FIG. 10b illustrates rail and actuator pressure over time.
Figure 10C:
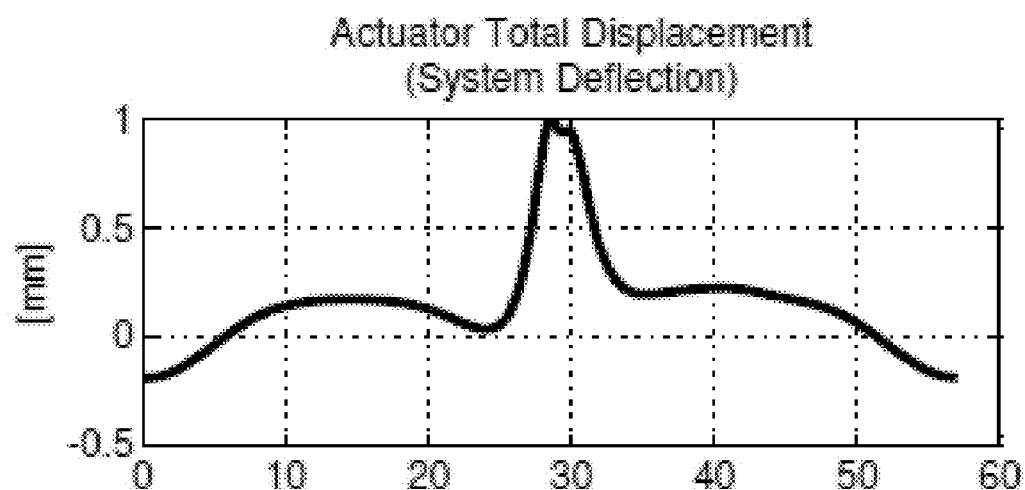
FIG. 10c illustrates actuator total displacement over time.
Figure 10D:
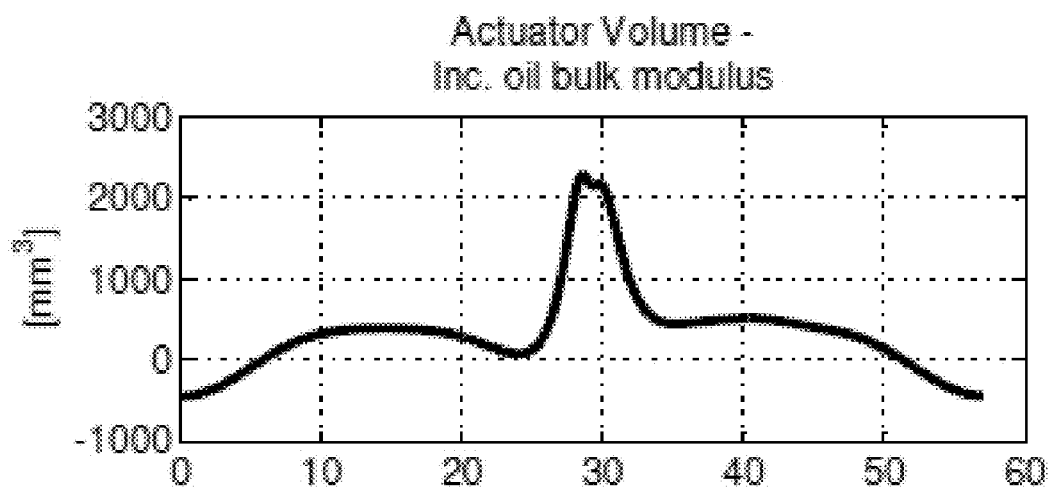
FIG. 10d illustrates actuator volume, including oil bulk modulus, over time.
Figure 10E:
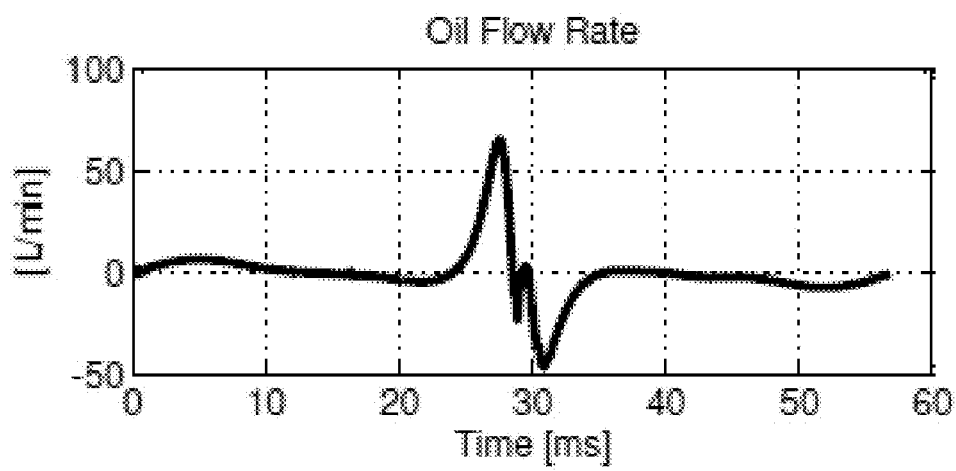
FIG. 10e illustrates the oil flow rate over time.
Figure 10F:
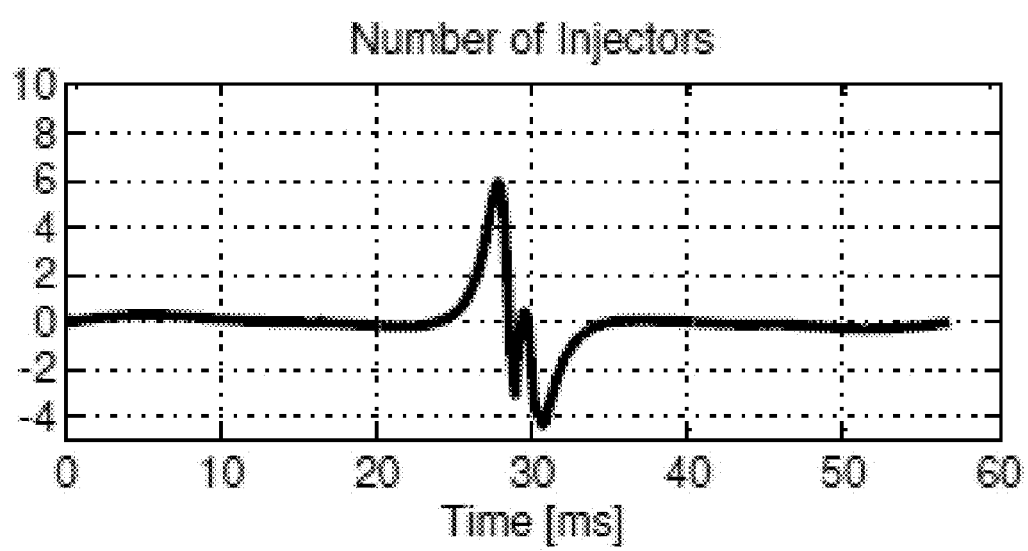
FIG. 10f illustrates the actuation of the injectors over time.

FIGS. 10a through 10f illustrate the testing apparatus calculations. FIG. 10a illustrates the big end bearing force over time (milliseconds) and as can be seen at around 28 milliseconds the bearing force peaks at approximately 280 kN. Around 28 milliseconds is where the crank turns through the first 360° in a combustion cycle. FIG. 10b illustrates pressure of the hydraulic oil over time in the rail and cylinder. The rail pressure remains constant at 2,000 bar and at approximately 28 milliseconds, the cylinder pressure peaks at just under 1500 bar. FIG. 10c illustrates the defection of the testing frame over time and at approximately 28 milliseconds the deflection of the testing frame reaches a peak at is 1 mm. FIG. 10d illustrates the cylinder volume, factoring in the oil bulk modulus, which peaks at around 2500 mm$^3$ at around 28 milliseconds. FIG. 10e illustrates the oil flow rate, which peaks around 70 liters per minute at around 28 milliseconds. FIG. 10f illustrates the actuation of the injectors over time. The positive number of injectors creates a positive force, so when they open they force the oil into the system. The negative number of injectors reduces the force by allowing the oil to move out of the system when they are open.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. An apparatus, comprising:
a piston bore, wherein said piston bore exhibits a longitudinal axis;
a piston, including a piston head and a piston shaft, wherein said piston is axially displace-able within said piston bore along said longitudinal axis, wherein said piston bore and a first surface of said piston head form a first working volume and displacement of said piston alters said first working volume;
a first plurality of injectors coupled to said first working volume and a first common rail, wherein said first plurality of injectors are configured to inject a hydraulic fluid from said common rail into said first working volume;
said first common rail configured to store said hydraulic fluid at an elevated pressure of 1,000 bar or greater;
a pump coupled to said first common rail configured to maintain said hydraulic fluid in said common rail at said elevated pressure; and
a flow path between said first working volume and a reservoir for said hydraulic fluid.

2. The apparatus of claim 1, wherein said hydraulic fluid exhibits a bulk modulus of greater than 5,000 bar at a temperature of 100° C. and a pressure of 500 bar.

3. The apparatus of claim 1, wherein said first plurality of injectors is positioned radially around said longitudinal axis of said piston bore.

4. The apparatus of claim 1, further comprising a bearing associated with said piston shaft, wherein said piston shaft applies a load to said bearing upon displacement of said piston shaft.

5. The apparatus of claim 4, further comprising a connecting rod pivotably connected to said piston shaft at a first end of said connecting rod and a bearing mounted in a second end of said connecting rod.

6. The apparatus of claim 4, wherein said bearing is a journal bearing.

7. The apparatus of claim 1, wherein said first working volume exhibits a volume in the range of 0.2 cm$^3$ to 25 cm$^3$.

8. The apparatus of claim 1, wherein said plurality of first injectors each are able to withstand a pressure in the range of 2,000 bar to 3,000 bar.

9. The apparatus of claim 1, wherein said plurality of first injectors each exhibit a flow rating at 100 bar of 1.00 L/min or greater.

10. The apparatus of claim 1, wherein said piston applies a load in the range of 50 kN to 300 kN at a rate of +/−50 kN/ms to +/−130 kN/ms.

11. The apparatus of claim 1, further comprising a second working volume formed by a second surface of said piston head and said piston bore; a second plurality of injectors coupled to said second working volume and a second common rail, wherein said second plurality of injectors are configured to inject hydraulic fluid from said second common rail into said second working volume, and said second common rail is maintained at a pressure of 1,000 bar or greater.

12. The apparatus of claim 1, further comprising a third plurality of injectors configured to remove hydraulic fluid from said first working volume.

13. The apparatus of claim 1, further comprising a fourth plurality of injectors configured to remove hydraulic fluid from said second working volume.

* * * * *